Figure 1:
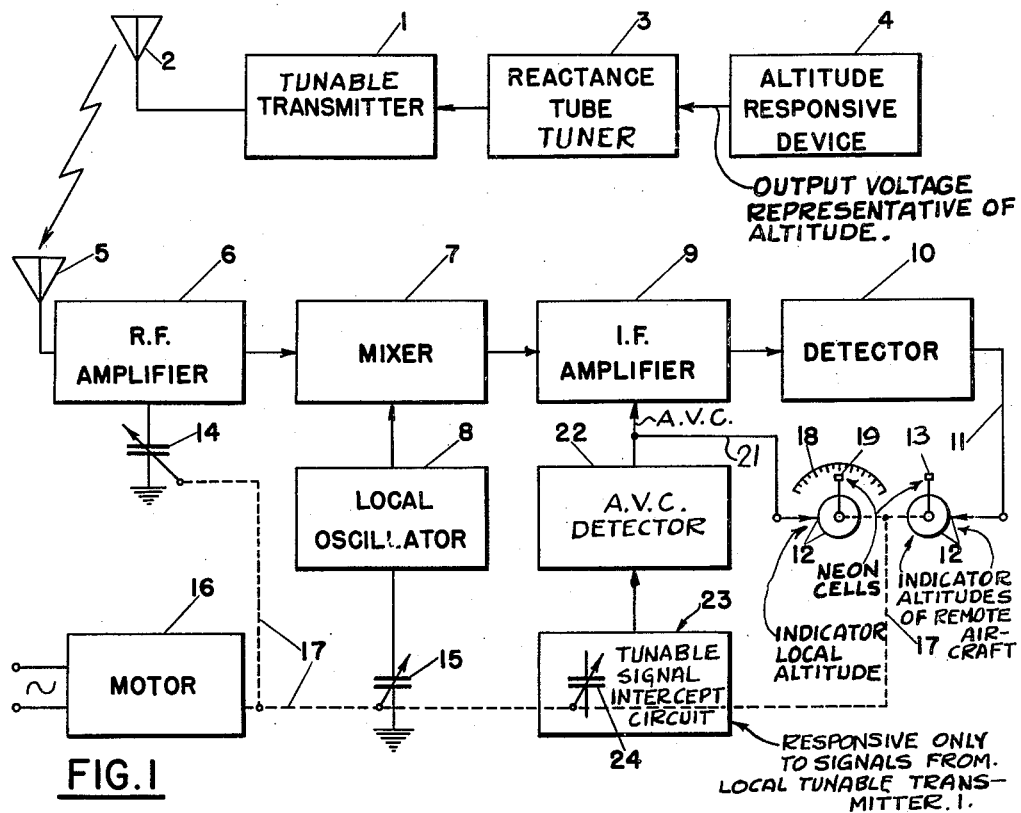

Feb. 28, 1950 M. WALLACE 2,498,933
TELEMETRIC ALTITUDE INDICATOR FOR AIRCRAFT
Filed April 19, 1946

Inventor
MARCEL WALLACE
By Hyman Hurwitz
Attorney

Patented Feb. 28, 1950

2,498,933

UNITED STATES PATENT OFFICE 2,498,933

TELEMETRIC ALTITUDE INDICATOR FOR AIRCRAFT

Marcel Wallace, Fairfield County, Conn., assignor, by mesne assignments, of one-half to Panoramic Radio Corporation, New York, N. Y., a corporation of New York Application April 19, 1946, Serial No. 663,314

9 Claims. (Cl. 177—351)

1

This invention relates generally to navigational systems for indicating the altitudes or the relative altitudes of a plurality of aircraft.

It is an object of this invention to provide a navigational system for telemetrically indicating the altitudes or the relative altitudes of one or more remote aircraft at a local station.

It is a further object of the invention to provide a stratoscopic system for indicating aboard any of a plurality of aircraft, the altitudes or the relative altitudes of a plurality of aircraft.

It is another object of the invention to provide an extremely simple, light and economical apparatus for providing aboard an aircraft or at a ground station, altitude indications derived from altitude representative signals transmitted by each of a plurality of aircraft.

Still another object of the invention resides in the provision of apparatus for translating a navigationally significant quantity, such as altitude, in terms of frequency of a radio carrier, and for translating the said frequencies into simultaneous indications at one or more predetermined locations.

It is a further object of the invention to provide a panoramic indicator for discrete frequencies in a band of frequencies, and comprising a neon tube and a tuned circuit synchronously actuated, the neon cell being illuminated substantially instantaneously upon tuning of the tuned circuit to the discrete frequencies.

In general, I provide aboard each of a plurality of aircraft flying in a predetermined area or along a predetermined airway, a transmitter the frequency of which may be determined in response to the control action of an aneroid cell or other device capable of providing a control action proportional to, or in some manner dependent upon, altitude.

While I have selected altitude as exemplary of information which I desire to impart telemetrically, I do not limit myself in this respect, since obviously other pertinent navigational information, or types of information which bear no direct relation to navigational information, may be transmitted for translation at some remote point. It is only necessary that the information desired to be transmitted be translatable in terms of discrete frequencies, to bring same within the intended scope of my invention.

It will be further obvious, while I propose to utilize radio signals for telemetric purposes, in the specific embodiment of the invention herein to be illustrated and described, that wire or coaxial cable transmission may be utilized. Further still, sonic or supersonic signals may be utilized as a transmitting medium, and transmission may take place in water, submarine craft being in this manner brought within the scope of the system, the analogy between submarines navigating under the surface of a body of water being close, in respects, to aircraft navigating in the atmosphere above the earth's surface.

While I prefer to transmit telemetric information in terms of frequency of a carrier, it will be obvious that frequency of a modulating signal applied to that carrier (the center frequency of the carrier itself being fixed, and the carrier being amplitude or frequency modulated with the information bearing signal) may likewise be utilized. It is also clear that I may utilize a pulsed frequency controlled carrier, should I desire to utilize the advantages inherent in pulse transmission.

I propose to interpret signals received from one or more originating or transmitting stations, at one or more receiving stations, which may be of the same general character as the originating or transmitting stations. Each of the receiving stations will be equipped with a device for mechanically tuning a translation equipment through a band of frequencies or adjustments to enable the translating device to discriminate between the various incoming information bearing signals, and for simultaneously and synchronously adjusting the mechanical condition or position of an indicator and for producing indications corresponding to the incoming information bearing signals in terms of the position of the indicator.

Specifically, I employ a neon cell rotating synchronously with a periodically scanning tuning element of a radio receiver, and cause the neon cell to be illuminated by signals to which the receiver may be rendered successively responsive in the course of the scanned tuning. I may provide a common actuating shaft for the neon cell and the tuning element of the radio receiver. Alternatively, I may desire to synchronize the motion of the neon cell and the motion of the tuning element by means of Selsyn, or equivalent systems, to enable separation of the neon cell indicator and of the signal receiving and translating means.

Figure 2:
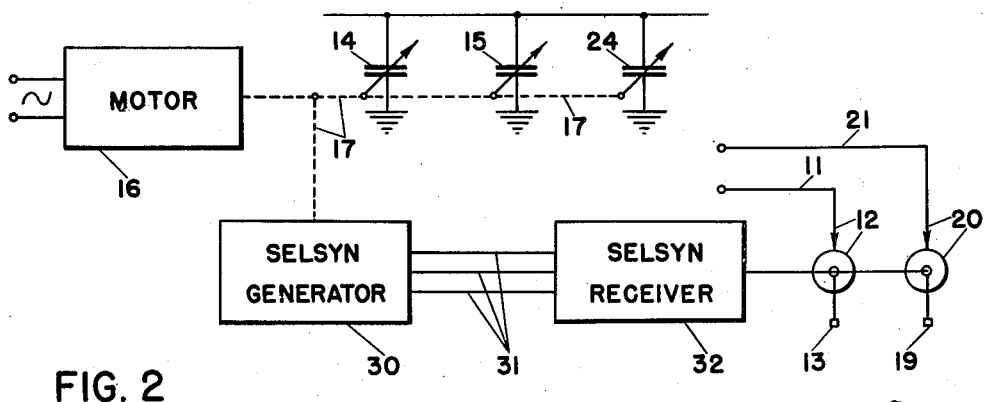

The above recited objects of the invention, and still further objects thereof, as well as preferred modes of accomplishing those objects, will be clarified in the following detailed description of various embodiments of my invention, when taken in conjunction with the accompanying drawings, wherein:

Figure 1 is a schematic block diagram of an embodiment of my invention, for transmitting from a predetermined station, a carrier frequency bearing a known relation to the reading of an altitude responsive device, and for receiving signals of a similar nature from each of a plurality of proximately located craft, and for simultaneously indicating the altitudes of said plurality of craft on a common indicator; and Figure 2 represents a modification of the embodiment of the invention illustrated in Figure 1 of the drawings, adapted for remote location of the indicator.

Referring now to the drawings in detail, the tunable radio transmitter 1, equipped with an antenna 2, produces electromagnetic radiation at a frequency determined by the reactance tube tuner 3. The latter is provided with control voltage from an altitude responsive device 4, such as an aneroid cell or some type of absolute altimeter.

The structure described in the previous paragraph is designed to produce a continuous radio signal at a frequency bearing correspondence with the output signal of the altitude responsive device 4. While I have illustrated and described a reactance tube frequency control, it will be obvious that a mechanical altitude responsive device, such as an aneroid cell, may be utilized to position directly the plates of a condenser associated with the tunable transmitter 1 and which comprises part of the tuning circuit for said transmitter. The specific manner of controlling the transmitter 1 is not a part of my invention and I may use any known or obvious means for such purpose.

The receiver-indicator apparatus utilized in the practice of my invention comprises a receiving antenna 5, coupled to a radio frequency amplifier 6, the output of which is applied to a mixer 7 for frequency conversion thereby by heterodyning that output with a signal derived from local oscillator 8, to a frequency suitable for amplification in the fixed frequency I. F. amplifier 9. The output of the I. F. amplifier 9 may be applied to a detector 10, the detected output of which is applied via lead 11 to a brush and slip ring, symbolically illustrated at 12, and which supplies said signal to a neon cell 13, for illuminating said cell upon application of the signal.

The R. F. amplifier 6 and the local oscillator 8 include tuning means, illustrated as condensers 14 and 15 respectively, for determining the resonant frequency thereof. The tuning adjustment of the condensers 14 and 15 is periodically varied by means of motor 16 and mechanical actuating means 17 through a series of values adapted to tune the amplifier 6 and the local oscillator 8 periodically through a continuous frequency spectrum, from some frequency $f_0$ representing zero altitude in terms of transmission from the transmitter 1, to some frequency $f_1$ representing the highest altitude capable of representation in the present system.

In synchronism with the variation of tuning of the amplifier 6 and the local oscillator 8, the neon indicator 13 is caused to rotate in proximity to a scale 18, calibrated in terms of altitude from a zero value corresponding to frequency $f_0$ to an altitude value corresponding to the frequency $f_1$, the calibration scale covering the full circle of rotation of the cell 13.

For convenience of construction the cell 13 and its slip ring 12 may be mounted on a common shaft 17 with the condensers 14 and 15, for rotation simultaneously of the cell 13 and the condensers 14 and 15.

Mounted on the shaft 17 is a further neon cell 19 and associated brushes and slip rings, symbolically illustrated at 20, and which may rotate on a slightly longer or a slightly shorter radius than the cell 13, to render the cells 13 and 19 readily distinguishable. The cell 19 is supplied with operating voltage via a lead 21, from an A. V. C. detector 22. The A. V. C. detector 22 derives its input voltage from a tunable signal intercept circuit 23, tunable in synchronism with the R. F. amplifier 6, the tunable element of the circuit 23 comprising a variable tuning element 24, such as a variable condenser, preferably mounted on the shaft 17 with condensers 14 and 15. The tunable signal intercept circuit 23 is arranged to be responsive only to signals from the local tunable transmitter 1, and not to signals from remote transmitters. At the moment the circuit 23 is tuned through the frequency of the transmitter 1, during rotation of condenser 24, it develops a voltage of considerable magnitude, due to its close coupling with the antenna 2, this voltage being rectified in the A. V. C. detector 22 and applied to the I. F. amplifier 9 as an A. V. C. voltage to render the same insensitive to output signals from the mixer 7. In consequence of this action the neon indicator cell 13 does not display any signal corresponding with the output frequency of the local transmitter 1, this frequency being indicated only on the cell 19, which is responsive via lead 21 to A. V. C. voltage.

In accordance with the present invention, then, remotely generated signals at frequencies representative of altitudes of remote aircraft, are received at antenna 5 aboard a local aircraft, and amplified and detected by R. F. amplifier 6, mixer 7, I. F. amplifier 9 and detector 10. The output of the latter is applied to neon cell 13 to provide visual indications. Since the local receiver comprising R. F. amplifier 6, mixer 7, I. F. amplifier 9 and detector 10 is continuously being tuned through a band of frequencies corresponding with altitude by motor 16, and since the rotative position of neon cell 13 always corresponds with the tuned frequency of the receiver, the positions of the neon cell when illuminated correspond with the frequencies of the signals received from the remote craft, and hence with their altitudes.

The local tunable transmitter 1 provides, at antenna 5, a very much stronger signal than is provided from remote aircraft. Therefore if the receiver is sufficiently sensitive to receive the remotely originating signals it will be strongly overloaded or saturated in response to the local transmitter 1, which will prevent reception of remotely originating signals adjacent in frequency to the frequency of the local transmitter.

The tunable signal intercept circuit 23 is a tunable circuit which is tuned in synchronism with the amplifier 6, and with local oscillator 8, and develops response only when tuned to the frequency of the local transmitter 1. The signal intercept circuit 23, accordingly, develops response only when the local receiver is tuned, during each cycle of frequency scan, to the frequency of the local transmitter.

At this time the output of the signal intercept circuit 23 is detected by A. V. C. detector 22, the output of which is applied to de-sensitize or cut-off the I. F. amplifier 9. Hence, the local receiver does not respond to the local transmitter, and the altitude of the local aircraft is not indicated on neon cell 13. The A. V. C. voltage developed by detector 22 is applied, however, to neon cell 19, which indicates then only local altitude.

The tunable signal intercept circuit 23 and the A. V. C. detector 22 operate, then, to prevent response of the local receiver to the local transmitter, which would otherwise overload or saturate the receiver, and also to provide a signal representative of local altitude and which is readily distinguishable from altitude indications of remote aircraft.

It is realized that if remote aircraft are flying at precisely the altitude of the local aircraft, no indication will be provided of the presence of the remote aircraft. But the total loss of response, in terms of inoperative range of the receiver, is reduced by virtue of the presence of intercept circuit 23 and A. V. C. detector 22.

It is clear from the preceding detailed description, that a plurality of aircraft flying in the same general vicinity and each equipped with a transmitter-receiver-indicator in accordance with Figure 1 of the drawings, will each transmit signals corresponding in frequency to its own altitude, and will each receive all altitude significant signals from all the aircraft, for indication of said signals simultaneously on a single indicator of simple construction.

In some applications of the present invention it is desirable to position the transmitter and receiver at a position remote from that of the indicator, the latter being positioned adjacent the pilot or navigator of an aircraft. In such case the cells 13 and 19 may be rotated by means of a Selsyn or equivalent system from the motor 16, as is illustrated in Figure 2 of the drawings, the Selsyn generator 30 being mechanically coupled to the motor 16 and the Selsyn receiver 32 being maintained in proper relation to the generator 30 by control signals transmitted over lines 31.

While I have described a plurality of modifications of the present invention, it will be obvious that further modifications of the combinations and arrangements illustrated and described herein may be accomplished, as well as modifications of various of the elements and of the structural features, without departing from the scope of the invention as defined in the appended claims.

What I claim and desire to secure by Letters Patent of the United States is:

1. In combination, a continuously transmitting local transmitter, a substantially continuously receiving frequency scanning receiver associated with said transmitter and susceptible of receiving at high signal levels transmissions from said transmitter, a plurality of remote transmitters each tunable to transmit a signal at a frequency determined by the value of a measurable quantity, the transmission frequencies of said local transmitter and of said remote transmitters falling within the scanning range of said receiver, an indicator periodically moving in synchronism with the scanning operation of said scanning receiver, means responsive to reception of each signal by said receiver deriving from said remote transmitters for energizing said indicator to provide a visible indication of received frequency, and means operating during reception of signals by said receiver derived from said local transmitter for transiently disabling said receiver during such reception only.

2. The combination in accordance with claim 1 wherein said indicator comprises a flashing light source and an associated calibrated scale.

3. The combination in accordance with claim 1 wherein said indicator comprises a pair of light generating cells, means responsive only to signal output from said receiver for energizing one of said pair of cells and means responsive only to signals deriving from said local transmitter for energizing the other of said pair of cells.

4. In combination, a local transmitter for transmitting signals at a frequency representative of the value of a measurable quantity, a local receiver for scanning a range of frequencies representative of a range of values of said measurable quantity and including said frequency transmitted by said local transmitter, at least one remote transmitter for transmitting a signal at a frequency representative of a value of a measurable quantity and falling within said range of frequencies, an indicator having a pair of indicating members, means responsive to signals received by said receiver from said at least one remote transmitter for actuating one only of said indicating members, and means responsive to signals deriving only from said local transmitter for actuating the other of said indicating members.

5. The combination in accordance with claim 4 wherein said indicating members each comprise a neon cell energizable for providing a visible indication.

6. The combination in accordance with claim 4 wherein is provided means responsive to signals deriving from said local transmitter for temporarily disabling said receiver upon coincidence of tuning of said receiver with the frequency of said local transmitter during a scanning operation of said receiver.

7. The combination in accordance with claim 6 wherein is provided means responsive to said means responsive to signals deriving from said local transmitter for actuating said other of said indicating members.

8. The combination in accordance with claim 4 wherein said last means comprises a tunable trap circuit, means for maintaining said trap circuit continuously tuned to the frequency of said local receiver, whereby a peak voltage is developed in said trap circuit during each scan of the frequency of said trap circuit through the frequency of said local transmitter, means responsive to said peak voltage for generating a gain control voltage, means for applying said gain control voltage to reduce gain of said local receiver, and means for applying said gain control voltage to actuate said other of said indicating members.

9. In combination, a local transmitter, means for tuning said transmitter to transmit signal at a frequency representative of the value of a measurable quantity, a local tunable receiver, means comprising a mechanically actuable first condenser for periodically tuning said local tunable receiver over a band of frequencies including said first named frequency, at least one remote transmitter, means for tuning said remote transmitter to transmit a further signal at a frequency representative of a further value of said measurable quantity, and falling within said band of frequencies, an indicator means having a first rotating visual indicator and a second rotating visual indicator, said indicators actuable to indicate in response to signals, a tunable trap circuit having a further mechanically actuable first condenser for tuning said tunable trap circuit over said band of frequencies, a common drive means for periodically actuating said first and further condensers and for rotating said first and second visual indicators in common synchronism with said trap circuit and said receiver tuned continuously to substantially identical frequencies, means responsive to signal output from said receiver in response to said further signal for actuating said first visual indicator to indicate, means responsive to signal developed in said tunable trap circuit in response to said first mentioned signal for developing a gain control signal for said receiver, means for applying said gain control signal to reduce gain of said receiver, and means responsive to said given control signal to actuate said second visual indicator to indicate.

MARCEL WALLACE.

REFERENCES CITED

The following references are of record in the file of this patent:

UNITED STATES PATENTS

| Number | Name | Date |
|---|---|---|
| 1,702,423 | Wensley | Feb. 19, 1929 |
| 2,055,883 | Terry | Sept. 29, 1936 |
| 2,157,122 | Dunmore | May 9, 1939 |
| 2,378,604 | Wallace | June 19, 1945 |
| 2,403,603 | Korn | July 9, 1946 |
| 2,421,106 | Wight | May 27, 1947 |

FOREIGN PATENTS

| Number | Country | Date |
|---|---|---|
| 312,140 | Italy | Oct. 24, 1933 |